United States Patent Office 3,314,493
Patented Apr. 18, 1967

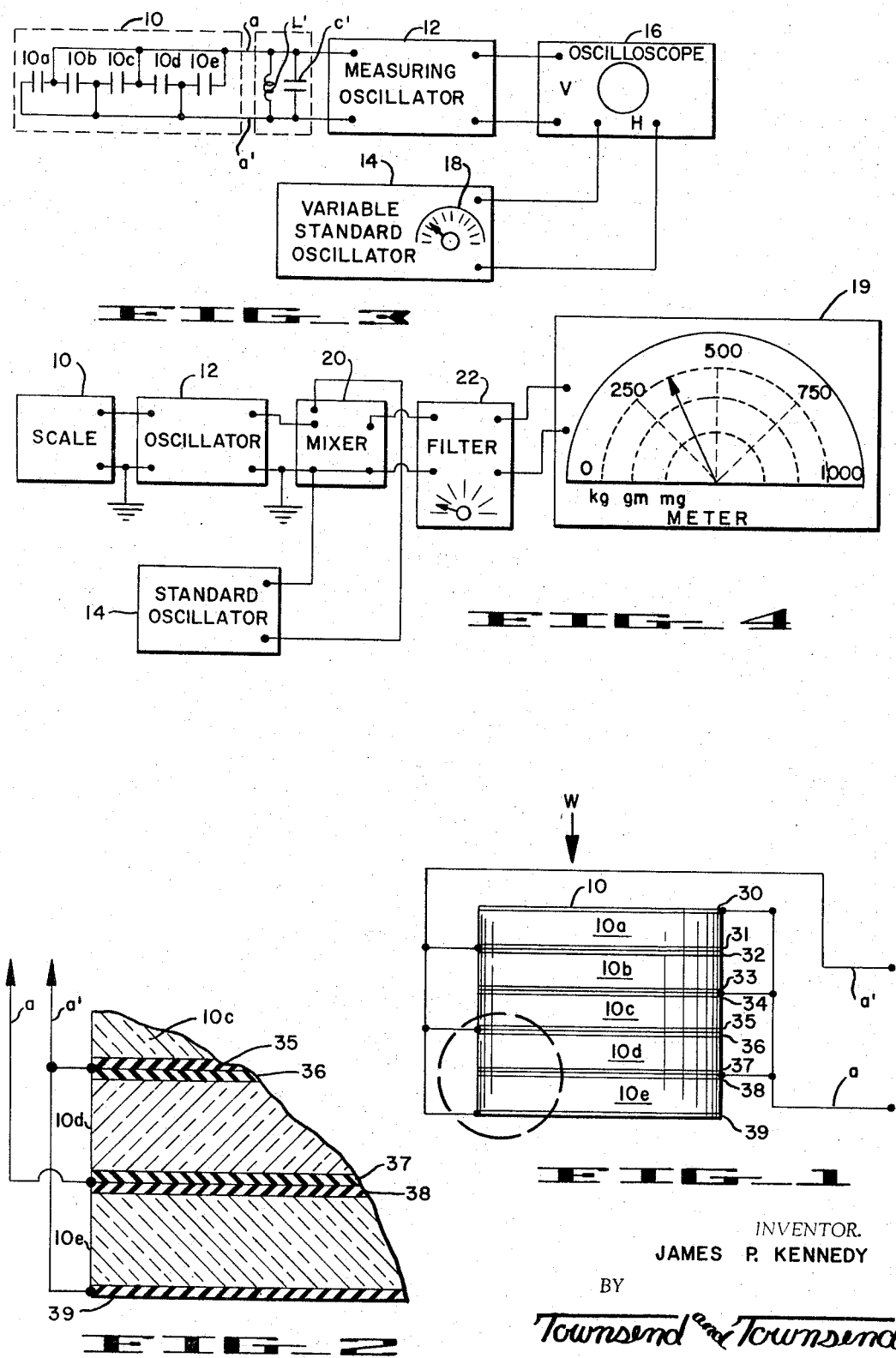

3,314,493
ELECTRICAL WEIGH SCALE WITH
CAPACITIVE TRANSDUCER
James Patrick Kennedy, 35 Valdez Ave.,
San Francisco, Calif. 94112
Filed Nov. 4, 1964, Ser. No. 408,822
3 Claims. (Cl. 177—210)

This invention relates to electronic scales and it relates particularly to transducers of the capacitance type employed in electronic weighing apparatus.

In electronic scales of the capacitive type, a capacitive element is employed as a transducer in which the weight or stress applied against the transducer effects a change of capacitance which is converted by conventional electronics to provide a signal proportional to the variation in the capacity. Thus, an electrical output is obtainable which is an analog of the weight of the object being tested. Previous devices employed for this purpose used dielectrics within the transducer having a substantial amount of elasticity. Such dielectrics, however, many times exhibit permanent deformation when subjected to overloading or continued inaccuracy in the transducer. Other types of devices used for this purpose employ such materials as piezo electric type of units.

One of the objects of this invention is to provide a transducer in which the dielectric is formed of silica-glass which has the property of being substantially non-elastic and exhibits excellent memory characteristics, whereby scales formed in accordance with the present invention can measure extremely wide ranges of weights with a linearity of sensitivity easily converted to electronic read-outs.

As a further feature and advantage the transducer of this invention exhibits sufficient ruggedness to withstand substantial loading and at the same time exhibits characteristics of memory that will allow the glass to return to a normal unloaded condition physically identical to the condition prior to loading. By virtue of this feature the device remains in calibration throughout long periods of use.

In addition the devices disclosed in the prior art which utilize ceramic materials are extremely sensitive to heat, and because of their low ohmic contact the manufacture of such devices is expensive and their range of operation is relatively narrow.

Accordingly it is another object of this invention to provide an improved transducer for an electronic weighing apparatus which is relatively insensitive to heat and because of its relatively large ohmic contact has a relatively large range of operation.

The transducer of this invention employs a plurality of glass plates formed of silica glass. The plates are arranged in stacked relation with abutting faces of the plates coated with a smooth, conductive material. The coating forms a uniform high conductivity interface between the plates. A pair of interconnected interfaces is formed by connecting alternate interfaces together, and the pair is connected to a capacity responsive circuit to register an electrical signal which is proportional to the capacity of the glass between the pair of interconnecting interfaces.

Other objects of the invention will be better understood from the following detailed description with reference to the accompanying drawings illustrating an embodiment of the invention, wherein:

FIG. 1 is a schematic diagram of a transducer 10 embodying the invention;

FIG. 2 is an expanded view of the encircled portion of the transducer 10 shown in FIG. 1;

FIG. 3 is a schematic circuit diagram in block form of an electronic weighing system employing the transducer embodying the invention; and FIG. 4 is a schematic circuit diagram in block form of another electronic weighing system utilizing the transducer embodying the invention.

Reference is now made to FIG. 1 of the drawings wherein an electronic weighing transducer 10 in accordance with the invention is illustrated. The transducer 10 is formed by five microscopic slides or plates of silica ($SiO_2$) glass 10a–10e, each silvered at its sides as shown in more detail in FIG. 2. The metallized coating may be applied to the glass plates 10 by well known techniques for such purposes. A preferred method is to deposit the metal on the glass by vacuum vaporization. The metal coating or metallic plate employed also may be silver paint for example. It is also possible to merely lay metallic plates or laminated foils between the glass plates. The metallic plates should be smooth and match the surfaces of the glass plates to avoid non-linearity of the capacitance due to air spacings. This type of capacitance is extremely hard to control and hence measurements depending on the magnitude of capacitance exhibited would be highly unpredictable.

The metallic coatings or laminated foils between the glass plates are connected to each other in alternate pattern to form the terminal leads $a$ and $a'$ respectively, to wit: coatings 30, 33, 34, 37 and 38 are connected to each other forming lead terminal $a$ while coatings 31, 32, 35, 36 and 39 are connected to form terminal $a'$. Thus, glass plates 10a, 10b, 10c, 10d and 10e respectively insulate the corresponding metal plates 31–39 forming a plurality of capacitors connected in parallel with each other. As the transducer 10 is placed on a base (not shown) and an object having a weight W is placed on the transducer 10 to exert a force in the direction indicated by the arrow, the glass plates 10a–10e are compressed a given amount as a function of the magnitude of the weight W. Because the value of the capacitance of an ordinary parallel-plate capacitor is inversely proportional to the distance between the plates, when the glass plates are compressed, the distance between the plates decreases and the capacitance is thereby increased.

Although the transducer 10, shown in FIG. 1 comprises five glass plates 10a–10e, the number of glass plates in a transducer embodying the invention is not limited to that number, which in practical cases may be ten or more. It should be noted that in case of an even number of glass plates, the top and bottom metallic plates or foils would be connected to each other thereby providing self-shielding and avoiding the problem of stray capacitance.

Although as shown in FIGS. 1 and 2 each of plates 10a–10e is illustrated to have a laminated foil painted or deposited on each of its two sides, it should be understood that a single laminated foil would be sufficient between contiguous glass plates.

The advantage of silver plating each side of the glass plates is to control easily and accurately the capacitance of each individual capacitor. In practice each glass plate is made of equal thickness and because the distance between the plates controls the capacitance exhibited, each capacitor exhibits equal capacitance. It should be noted that the thickness of the plates does not affect the magnitude of capacitance exhibited unless the thickness is large relative to the area of the plate whereby stray capacitance is present. Thus thickness provided by the double laminated foil does not affect the magnitude of capacitance exhibited by it avoids non-linearity in the capacitor due to possible air pockets, or water condensation between the plates. This non-linearity cannot be compensated for thus resulting in inaccurate readings.

With respect to the metallic plates 31–39 it should be noted that the type of metallic foil employed is generally unimportant as long as it provides good conduction. As is well known the resistance associated with a capacitor should be such that it provides a large equivalent parallel resistance or a small equivalent series resistance. If the capacitor is employed in tuned circuits, the magnitude of the resistance controls the Q of the capacitor and of the tuned circuit and is therefore very critical.

In the system shown in FIG. 3, the transducer 10 is built in accordance to the description given in connection with the device illustrated in FIG. 1. The top metallic plate 30, may constitute the platform of the electronic scale where the object to be weighed is placed. The metallic plate 39 in turn is placed on a base (not shown) adapted to hold the transducer 10. When an even number of metallic plates is employed, appropriate shielding is provided in well known manner to avoid stray capacitance to affect the magnitude of the capacitance exhibited by transducer 10. As previously mentioned, an uneven number of metallic plates makes shielding unnecessary because both extreme plates would be at the same fixed potential, such as ground for example.

An alternate preferred construction of the transducer 10 includes a top metallic plate or platform insulated from the top metallic plate 30 by three or four glass plates similiar to glass plates 10a–10e. The insulation thus provided avoids stray capacitance from the object being tested or weighed to affect magnitude of the capacitance exhibited by the transducer 10. The top metallic platform in this case is electrically connected to ground.

The transducer 10 is electrically coupled to the frequency determining network of a measuring oscillator circuit 12, of well know characteristics to control in conjunction with the equivalent capacitance C' and inductance L' of such network the frequency oscillations of oscillator 12. The equivalent capacitance C', for example, may be provided by the interelectrode capacitance of the active device employed in the oscillator circuit. In the case of a vacuum tube, for example, the equivalent capacitance may be the grid-cathode interelectrode capacitance, while in the case of a transistor the base-emitter interelectrode capacitance would constitute the equivalent capacitance C'.

The transducer 10, as shown in schematic form in FIG. 1, comprises a plurality of capacitors 10a–10d connected in parallel with each other. The value of each capacitor changes when a compressive force or weight applied thereto compresses the glass plates for reasons explained above in reference to FIGS. 1 and 2.

A variable oscillator 14, which may also be a standard type oscillator circuit, is employed as a standard or local oscillator, to beat against the oscillator circuit 12. Oscillators 12 and 14 are designed to oscillate at the same frequency if there is no weight or force applied to the transducer 10. To check that such oscillations are at the same frequency, the output signals from the first and second oscillators are respectively coupled to the vertical (V) and horizontal (H) deflection plates of an oscilloscope 16 of well known construction. When the two signals from the oscillators 12 and 14 are of the same frequency, the scope will show the well known Lissajous pattern corresponding to equal vertical and horizontal deflection frequencies.

As the frequency of the oscillator 12 varies due to a weight being applied to the transducer 10, the Lissajous figure pattern on the screen of the scope changes as a function of the frequency. By varying the frequency of oscillation of the oscillator 14 until the zero beat Lissajous figure appears in the screen, and recording the necessary frequency change of oscillator 14 the magnitude of the capacitance change in transducer 10 may be obtained. Because the change in capacitance is a direct function of the weight or force applied the weight of the object tested can thus also be obtained. A simple way to obtain the weight of the object is to calibrate the rotation of the frequency control knob (dial 18) in milligrams, grams and kilograms so that a change from a predetermined frequency of oscillation corresponds to a given weight or force being measured.

Another electronic scale wherein a transducer embodying the invention is employed is illustrated in FIG. 2 of the drawings to exemplify the variety of apparatus which may employ a transducer in accordance to the invention. The same numerals are employed in both FIGS. 3 and 4 to indicate similar circuits or circuit elements.

In the embodiment illustrated in FIG. 4, the output signals from both oscillators 12 and 14 are respectively coupled to a mixer circuit 20, to provide an output signal having a frequency equal to the difference in frequency of oscillation of oscillators 12 and 14. The output signal from the mixer circuit is appropriately filtered by filter-amplifier circuit 22 so that only the difference frequency signal may be utilized (the sum and product signals are included in the output signal from the mixer circuit). The difference signal, amplified by circuit 22 is then applied to a meter device, such as frequency meter 19 for example, and which may be any frequency meter of well known construction to determine the frequency change in the oscillator 12 and hence the force for weight applied to transducer 10. The frequency meter 19 may be directly calibrated in units of weight or force as illustrated in FIG. 4 of the drawings to provide direct weight readings.

The following is a summary of the operation of an electronic scale including the transducer embodying the invention: The weight or force to be measured is applied to the transducer 10 which increases the capacitance exhibited by the capacitors 10a–10e, whereby the frequency of oscillation of oscillator 12 is decreased. The frequency of oscillation is determined by the equation $$f = \frac{(L'C')^{-1/2}}{2\pi}$$

where L' and C' are respectively the equivalent inductance and capacitance of the frequency determining network of the oscillator 12 including the capacitance exhibited by the transducer 10.

The difference signal $f_2-f_1$, where $f_2$=frequency of oscillator 14 and $f_1$=frequency of oscillator 12, increases and so does the reading of the meter 19. The meter 19 is calibrated in units of force or weight whereby direct reading of the magnitude of the force or weight may be obtained.

While a particular embodiment of the invention has been shown, it will, of course be understood that the invention is not limited thereto, since modifications may be made without departing from the spirit and scope of this invention. Some of the possible modifications have been pointed out above as examples of possible alternatives in the construction of transducers embodying the invention.

What is claimed is:

1. A capacitive transducer for converting variations in force to be measured into an electrical analogue, said transducer comprising: a plurality of glass plates formed of silica glass; said plates being in a stacked relation; support means holding said stacked plates compressively opposing the application of the force to be measured with each plate being disposed in an axis normal to the direction of application of the force; a conductive interface on a surface of each of said plates; a first electric terminal connecting alternate first interfaces of said stacked plates; a second electric terminal connecting second interfaces of said plates disposed between said first interfaces, thereby connecting said first and second conductive interfaces in an electrically capacitive relation; said first and second conductive interfaces elastically variable with respect to one another through said silica glass as force against said transducer is varied, thereby varying the capacitive relation between the first and second terminals; and means for measuring variations in said capacitive relation across said first and second terminals.

2. A capacitive transducer for converting variations in force into an electrical analogue according to claim 1 and wherein said first and second conductive interfaces are formed by a foil disposed between said stacked plates.

3. A capacitive transducer for converting variations in force to be measured into an electrical analogue, said transducer comprising: a plurality of glass plates formed of silica glass; said plates being in a stacked relation; support means holding said stacked plates compressively opposing the application of the force to be measured with each plate being disposed in an axis normal to the direction of application of the force; a conductive interface on a surface of each of said plates; a first electric terminal connecting alternate first interfaces of said stacked plates; a second electric terminal connecting second interfaces of said plates disposed between said first interfaces, thereby connecting said first and second conductive interfaces in an electrically capacitive relation; said first and second conductive interfaces elastically variable with respect to one another through said silica glass as force against said transducer is varied, thereby varying the capacitive relation between the first and second terminals; a first oscillator connected to said first and second terminals for changing the frequency of said first oscillator by changing the force applied to said plates; a second oscillator having a constant frequency; and a meter responsive to the frequency difference between said first and second oscillators.

References Cited by the Examiner

UNITED STATES PATENTS

| | | | |
|---|---|---|---|
| 1,431,638 | 10/1922 | Dowling | 177—210 |
| 2,322,681 | 6/1943 | Zenor | 73—382 |
| 2,336,091 | 12/1943 | Gray | 317—261 |
| 2,395,442 | 2/1946 | Ballard | 317—261 |
| 2,614,416 | 10/1952 | Hollman | 317—246 |
| 2,725,548 | 11/1955 | Harris. | |
| 3,000,101 | 9/1961 | Giardino et al. | 177—210 X |

FOREIGN PATENTS

| | | |
|---|---|---|
| 1,003,062 | 11/1951 | France. |
| 913,700 | 12/1962 | Great Britain. |

RICHARD B. WILKINSON, *Primary Examiner.*

H. B. KATZ, R. S. WARD, *Assistant Examiners.*